United States Patent [19]
Ha

[11] Patent Number: 6,149,144
[45] Date of Patent: Nov. 21, 2000

[54] MOVABLE WORK BENCH

[76] Inventor: Tae-Hong Ha, 288-20, Kwangjang-Dong, Kwangjin-ku, Seoul, Rep. of Korea

[21] Appl. No.: 09/249,244

[22] Filed: Feb. 11, 1999

[30] Foreign Application Priority Data

May 14, 1998 [KR] Rep. of Korea ....................... 98-17302
Dec. 23, 1998 [KR] Rep. of Korea ....................... 98-57483

[51] Int. Cl.[7] ....................................................... B66F 3/00
[52] U.S. Cl. .................................. 269/17; 269/61; 269/71; 254/DIG. 16; 254/134; 254/97
[58] Field of Search ..................................... 248/170, 171, 248/422, 188.7, 121; 269/17, 61, 71; 254/DIG. 16, 134, 95, 97, 427, 6 R, 6 B, 6 C, DIG. 1, DIG. 4

[56] References Cited

U.S. PATENT DOCUMENTS 5,156,375 10/1992 Liegel et al. ..................... 254/DIG. 16

*Primary Examiner*—Robert C. Watson
*Attorney, Agent, or Firm*—Flehr Hohbach Test Albritton & Herbert LLP; Richard E. Backus

[57] ABSTRACT

A movable work bench used in repairing a transmission of a vehicle is provided, in which it is possible to control a desired height of the work bench, make fine adjustments for keeping the balance of the transmission supported on the work bench, and easily move the work bench due to the conditions of a working area. The movable work bench comprises a moving body installed at a lower portion of the work bench, a housing having one end mounted on a central portion and another end to which a cap is installed, an elevating means installed in the housing, a driving means mounted on a part of the elevating means for lifting and lowering the elevating means, and a supporting body safely supporting the transmission and lifted and lowered through the operation of the elevating means.

8 Claims, 8 Drawing Sheets

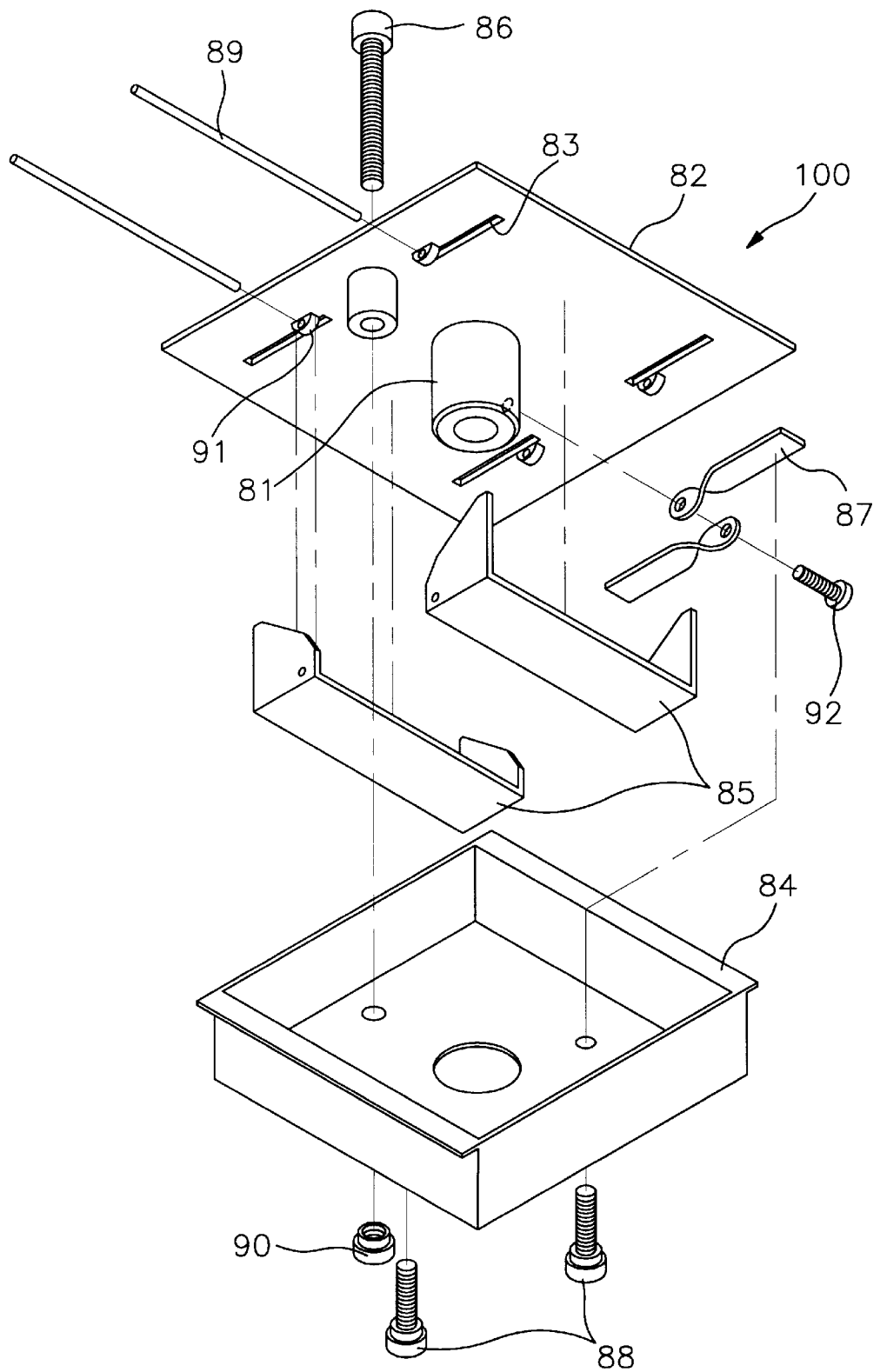

MOVABLE WORK BENCH

BACKGROUND OF THE INVENTION

1. Field of the Invention

This invention relates to a movable work bench, and more particularly to a movable work bench used for repairing a heavy object such as an engine or a transmission in a vehicle, in which the work bench is easily moved into a desirable working position and easily balances the heavy objects through a simple adjustment.

2. Prior Art

Generally, an apparatus for moving and elevating heavy objects is required at a repair shop. A worker lays the heavy objects on the apparatus, moves the apparatus into a working area in which repair tools and devices are placed, and makes the repairs. The conventional apparatus is individually made depending on circumstances of the repair shop or features of the heavy objects.

Repair work of the heavy object will be described below.

An engine or a transmission is components of a vehicle corresponding to heavy objects repaired in a repair shop. The apparatus for repairing the engine has a hoist mounted on a ceiling portion of the working area for elevating the engine, and a work bench for placing and supporting the engine from the hoist.

The hoist elevates the heavy engine through small force of the worker by using a chain and a body with a ratchet gear and a plurality of variable gears. The work bench comprises a supporting member for supporting the engine and a hydraulic elevating device for elevating the supporting member, which supports the engine so that the worker may conveniently repair the engine at the working area.

When the engine is placed on the supporting member of the work bench from the hoist, the worker repeatedly works a hydraulic pedal installed at the lower portion of the work bench, and thus raises fluid pressure. The supporting member is lifted by a lifting operation of the hydraulic elevating device and thus the working position of the work bench is properly adjusted.

However, because the work bench is lifted by the fluid pressure, when the worker reduces the fluid pressure for lowering the working position, a precise adjustment of the fluid pressure is difficult, so the worker may not precisely adjust the working position as desired.

Furthermore, when the worker moves the work bench supporting the engine in a working area, this movement in a confined working area is not easy. The heavy engine supported by the work bench may shake during the movement and repairing work thereof, which could possibly injure the worker.

THE SUMMARY OF THE INVENTION

To solve the above problems, it is a first object of the present invention to provide a movable work bench which improves work convenience by a proper adjustment of the work bench height.

It is a second object of the present invention to provide a movable work bench for safely placing heavy objects such as an engine or a transmission on an upper supporting body thereof and easily adjusting the front and rear height and the left and right height of the heavy objects.

It is a third object of the present invention to provide a movable work bench which is easily moved in accordance based on the conditions of a working area.

To obtain these objects, a movable workbench according to the present invention comprises a moving body including a polyhedral bottom plate forming a first fixing hole through which a stopper is inserted, a rotating disk rotatably installed on the bottom portion of the bottom plate and forming a plurality of second fixing holes which car communicate with the first fixing hole of the bottom plate respectively, a plurality of legs formed with one end rotatably connected to a corner and another end to which a caster is mounted, and a plurality of links connecting the rotating disk with the legs so that each leg is rotated at the same angle relative to each side of the polyhedral bottom plate;

a housing having one end mounted on a central portion and another end which a cap is installed on;

an elevating means including a plurality of chains mounted in the cap and extended into a lower portion of the housing, a plurality of rollers guiding each chain, a rack vertically movable for lifting and lowering the supporting body, of which one end is mounted on the supporting body and another end is connected to the chains, and an elevating cylinder housing the rack and integrally installing the rollers on the lower end, by which the elevating cylinder lifts and lowers through the operations of the chains and the rollers acting simultaneously with the lifting and lowering operation of the rack;

a driving means including a first handle for generating a driving force, a rotator, of which the first handle is mounted on a tapered portion and a cylindrical gear is mounted on a periphery, a first spline shaft, of which one end passes through a center of the rotator to be secured by a nut and another end has a first pinion engaged with the rack, a ratchet gear and a pawl coaxially installed with the rotator and able to rotate in one direction, a fixing plate for limiting an axial movement of the ratchet gear, a first spacer coaxially mounted between the rotator and the ratchet gear, a second spacer coaxially mounted between the ratchet gear and the fixing plate, a second handle for generating the driving force, and a second spline shaft of which one end is secured to the second handle and another end has a second pinion engaged with the cylindrical gear, wherein a diameter of the second pinion is smaller than that of the first pinion; and a supporting body including an upper plate forming a plurality of guide slots, a cylindrical boss and a plurality of first eyes, a rocking plate forming two pairs of lugs, a plurality of second eyes communicated with each of the first eyes on an upper surface of the rocking plate, and a central hole which the cylindrical boss passes through, two upholder s having a supporting portion for supporting a bottom surface of the rocking plate and both protruding pieces formed integrally with the supporting portion and pivotably connected to the rocking plate by means of a hinged rod passing through a pair of lugs, two fine adjusting devices for controlling the lifting and lowering operation of each upholder, a leveling means installed at a side portion for adjusting an angle of the rocking plate relative to the upper plate, and a lower box mounted on the bottom surface of the upper plate.

BRIEF DESCRIPTION OF THE DRAWINGS

This invention will be better understood and its various objects and advantages will be more fully appreciated from the following description taken in conjunction with the accompanying drawings, in which:

FIG. 8 is an exploded perspective view showing a supporting body of a movable work bench according to a second embodiment of the present invention.

DETAILED DESCRIPTION OF THE PREFERRED EMBODIMENT

Hereinafter, preferred embodiments according to the present invention will be described in detail with reference to the drawings.

Embodiment 1

Figure 1:
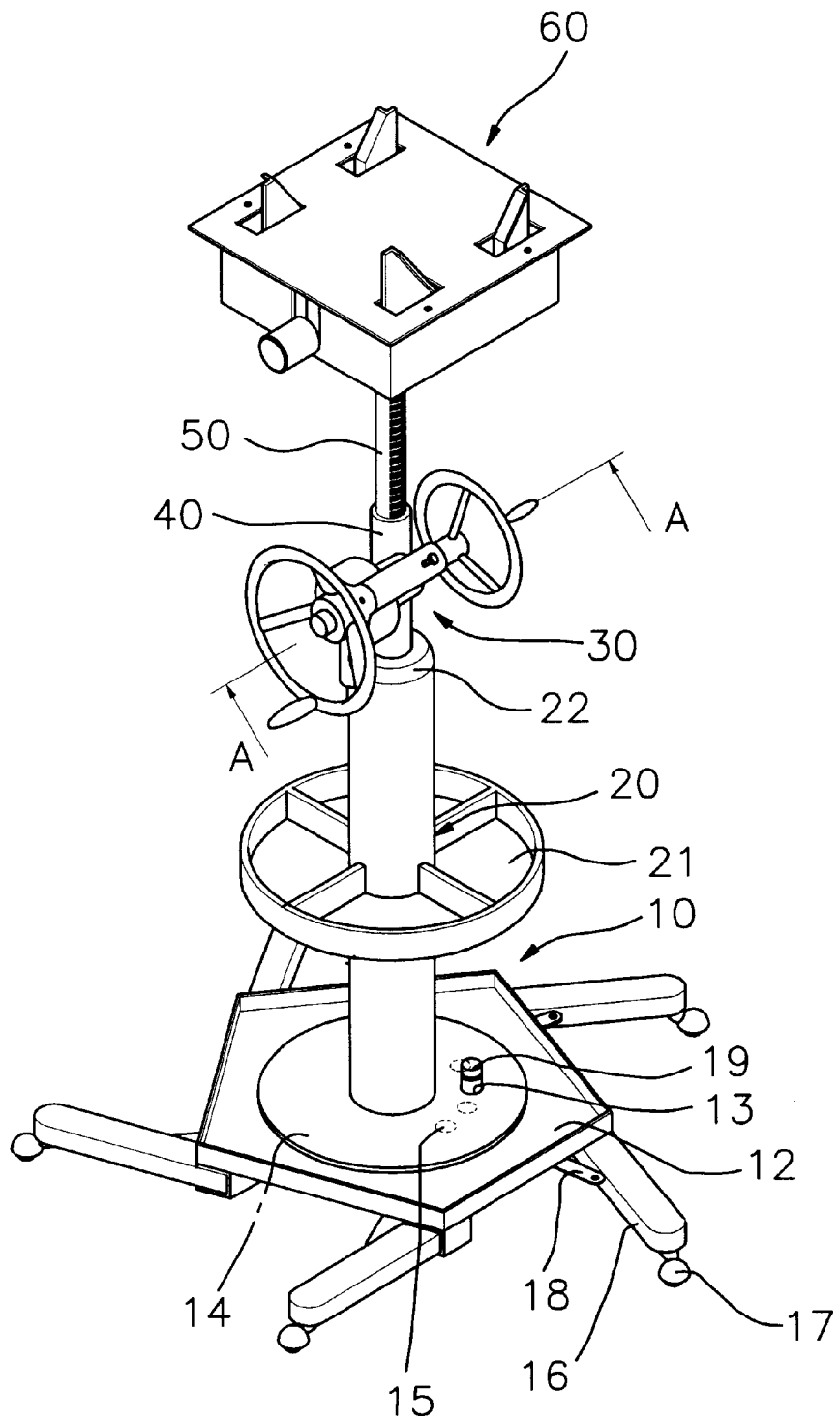
FIG. 1 is a perspective view showing a movable work bench according to a first embodiment of the present invention.

FIG. 1 is a perspective view showing a movable work bench according to a first preferred embodiment of the present invention.

As shown in FIG. 1, the movable work bench 100 according to a first preferred embodiment of the present invention comprises a moving body 10 for moving the work bench 100, a housing 20 installed in a central portion of the moving body 10, an elevating member 40 installed in the housing 20 and movable up and down, a rack 50 installed in the elevating member 40, a driving means 30 generating the driving force for elevating the rack 50, and a supporting body 60 installed on an upper end of the rack 50 for supporting heavy objects.

Also, a cap 22 is provided at an upper portion of the housing 20, and a tool box 21 receiving various tools and components is provided at a periphery of the housing 20.

The moving body 10 includes a polyhedral bottom plate 12, a rotating disk rotatably installed on the bottom portion of the bottom plate, and a plurality of legs formed with one end rotatably connected to a corner and another end to which a caster is mounted. Each leg is connected with the rotating disk by a link so that the legs are rotated at the same angle relative to each side of the polyhedral bottom plate.

Furthermore, a first fixing hole 13 is formed in the bottom plate 12, and a stopper 19 is inserted in the first fixing hole 13 for preventing the rotation of the rotating disk 14. A plurality of second fixing holes 15 are formed in the rotating disk 14, through which the stopper 19 passing through the first fixing hole 13 is inserted.

Figure 2:
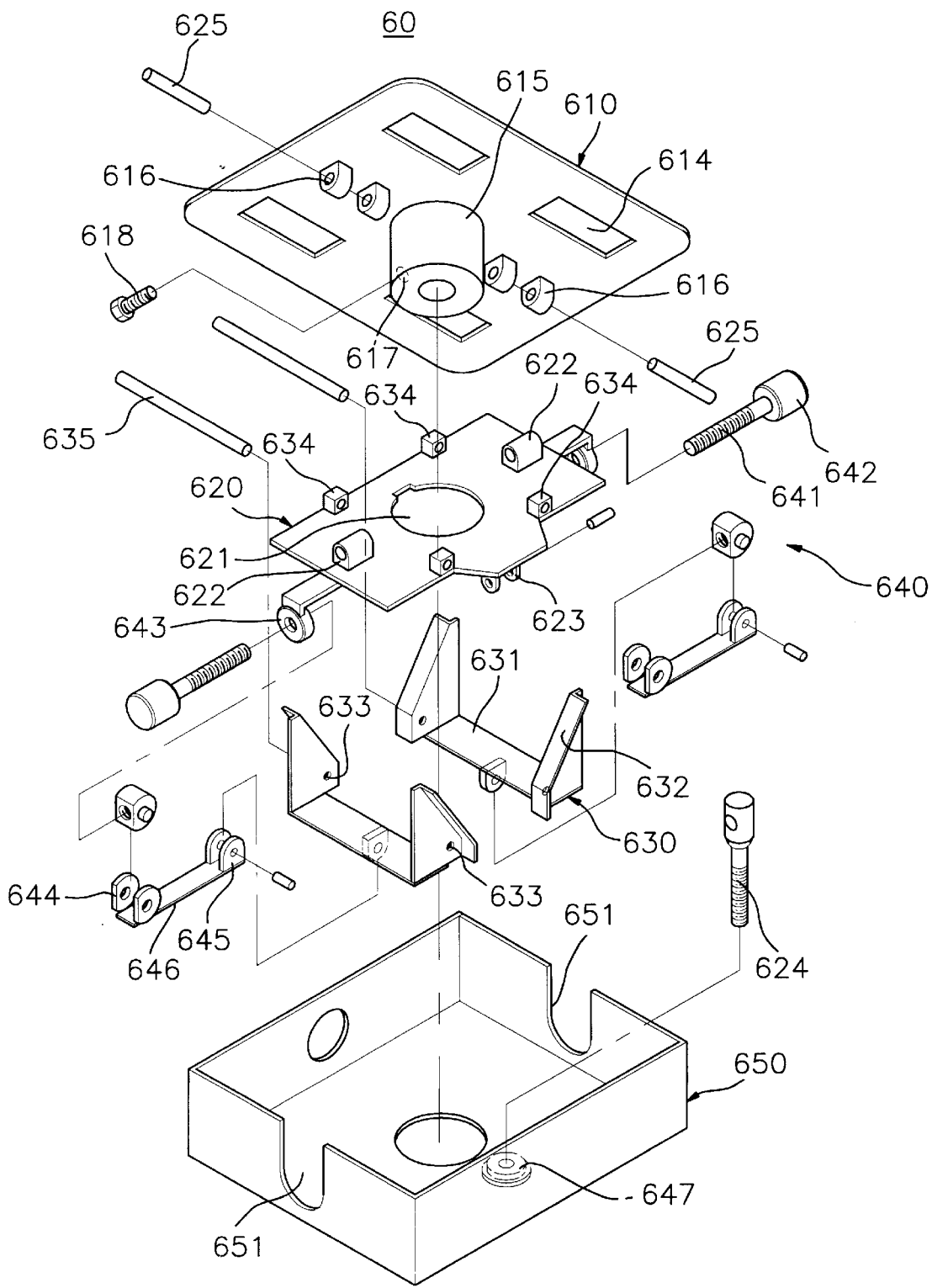
FIG. 2 is an exploded perspective view showing a supporting body of the movable work bench according to the first embodiment of the present invention.

FIG. 2 is an exploded perspective view showing a supporting body of the movable work bench according to the first embodiment of the present invention.

Referring to FIG. 2, the supporting body 60 including an upper plate 610 and a lower box 650 receives a rocking plate 620 and both upholders 630. The upper plate 610 has a plurality of guide slots 614 and a cylindrical boss 615. The rocking plate 620 is installed at a position opposite to a bottom surface of the upper plate 610, and has a central hole 621 which the cylindrical boss 615 passes through. The upholder 630 has a supporting portion 631 for supporting a bottom surface of the rocking plate 620 and two protruding pieces 632 integrally formed with both ends of the supporting portion 631. Also, two fine adjusting devices 640 are installed on both walls of the rocking plate 620 for elevating the protruding pieces 632 through the guide slots 614. The lower box 650 receives the rocking plate 620, the upholders 630, and the fine adjusting device 640.

The cylindrical boss 615 has a screw hole on a periphery thereof, and the fixing bolt 618 is inserted in an annular groove (not shown) formed at an upper portion of the rack 50, by which the supporting body 60 is secured to the rack 50.

A plurality of first eyes 616 are formed on both sides of the bottom surface of the upper plate 610, and a plurality of second eyes 622 corresponding to the first eyes 616 are formed at both sides of the upper surface of the rocking plate 620. The first eye 616 is connected with the second eye 622 by a pin 625.

Furthermore, a leveling means is installed in the supporting body 60 in order to adjust relative heights of both protruding pieces 632 of the upholder 630. The leveling means includes an angle adjusting screw 624 rotatably connected to a hinge axle 623 formed at a side of the bottom surface of the rocking plate 620, and a female screw 645 installed at a side of the lower box 650 and connected with the angle adjusting screw 624. Accordingly, the rocking plate 620 seesaws relative to the connecting portion of the first eye 616 and the second eye 622 by rotating the female screw 645.

A hole 633 which a hinged rod 635 passes through is provided on each protruding piece 632. The hinged rod 635 passes through the hole 633 and a pair of lugs 634 formed on both sides of an upper surface of the rocking plate 620, and thus pivotably connects the upholder 630 with the rocking plate 620.

Furthermore, the fine adjusting device 640 includes an adjusting part 642, a male screw 641 integrally formed with the adjusting part 642, a female screw 643 supporting the male screw 641 and secured to the rocking plate 620, a first hinge part 644 which the male screw 641 is rotatably joined, a second hinge part 645 pivotably connected to a hinge axle 637 projected from the supporting portion 631 of the upholder 630, and a connecting bar 646 connecting the first hinge part 644 with the second hinge part 645.

The lower box 650 forms two openings 651 for receiving each fine adjusting device 640 at both walls, being secured on the bottom surface of the upper plate 610 by means of a fastening means (not shown) such as welding or bolts.

Figure 3:
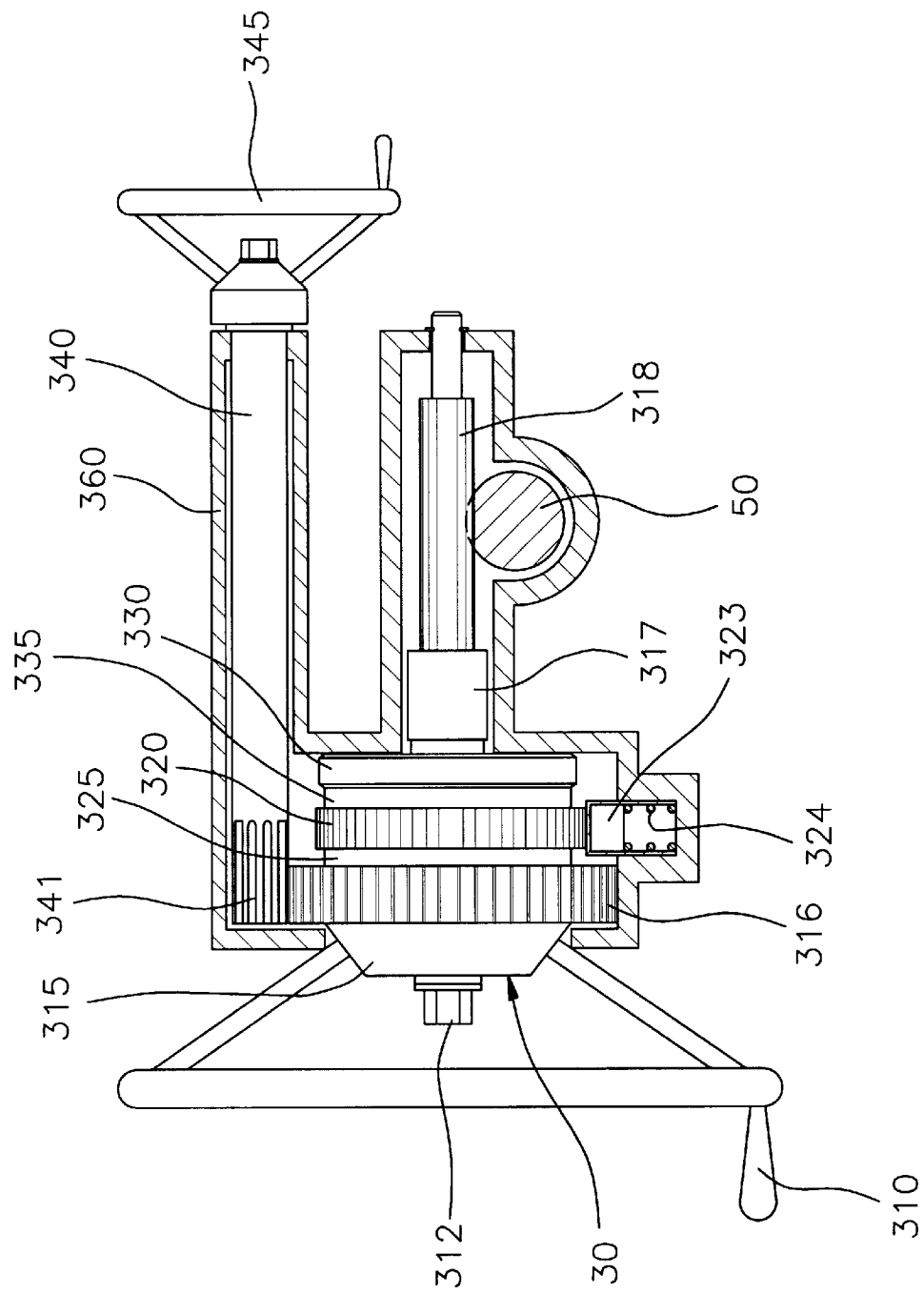
FIG. 3 is a sectional view showing a driving means of the movable work bench according to the first embodiment of the present invention.

FIG. 3 is a sectional view showing a driving means of the movable work bench according to the first embodiment of the present invention.

As shown in FIG. 3, the driving means 30 housed in the gear box 360 has a first handle 310 rotated by the worker, a rotator 315 having a peripheral portion and a tapered portion in which a cylindrical gear 316 is installed around the peripheral portion and the first handle 310 is mounted on the tapered portion, and a first spline shaft 317 passing through a center of the rotator 315 and secured by a nut 312. A ratchet gear 320 is installed on the first spline shaft 317 adjacent to the rotator 315 so as to prevent the rotator 315 from rotating in a reverse direction. A fixing plate 330 is installed on the first spline shaft 317 adjacent to the ratchet gear 320 so as to limit an axial movement of the ratchet gear 320. Also, a first spacer 325 is coaxially installed between the rotator 315 and the ratchet gear 320, and a second spacer 335 is coaxially installed between the fixing plate 330 and the ratchet gear 320. A pinion 318 of the first spline shaft 317 is engaged with the rack 50.

Furthermore, a pawl 323 is installed at a lower portion of the driving means 30 for preventing a reverse rotation of the ratchet gear 320, and a spring 324 is provided in a lower portion of the pawl so as to bias the pawl 323 upwardly.

In addition, a second spline shaft 340 and a second handle 345 are provided in the driving means 30 so that the worker may apply smaller force than the force applied for the rotation of the first handle and lift the rack 50, in which the second spline shaft 340 has a pinion 341 engaged with the cylindrical gear 316, and the second handle 345 is mounted on the other end of the second spline shaft 340.

Figure 4:
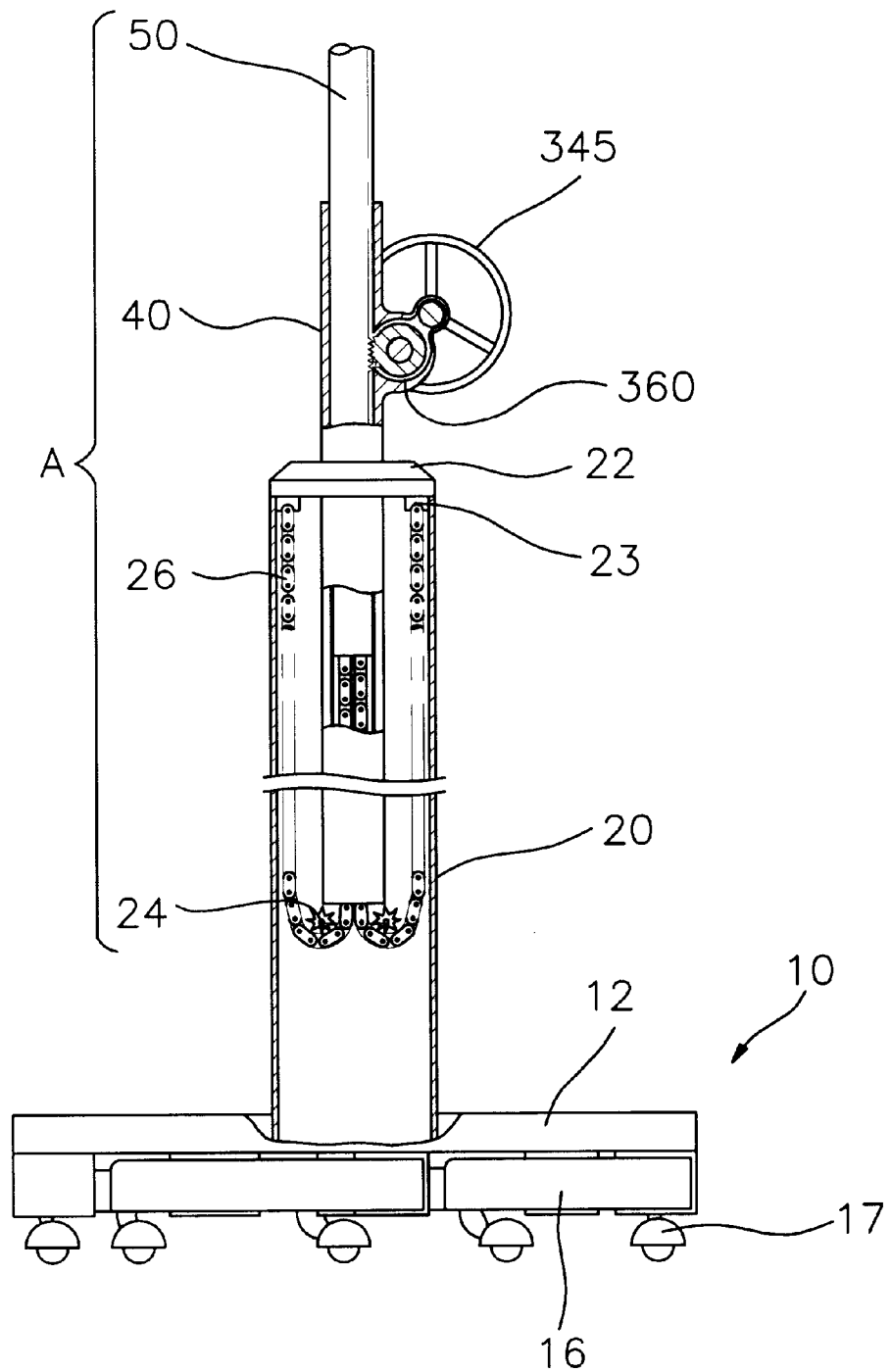
FIG. 4 is a partly sectional view showing an elevating means installed in a housing of the movable work bench according to the first embodiment of the present invention.

FIG. 4 is a partly sectional view showing an elevating means installed in a housing of the movable work bench according to the first embodiment of the present invention.

As shown in FIG. 4, the elevating means (A) comprises the rack 50, an elevating cylinder 40, a plurality of chains 26, and a plurality of rollers 24.

The elevating cylinder 40 is slidably installed in the housing 20, and is movable up and down. The rack 50 is movably installed in the elevating cylinder 40. More than two fixing portions 23 for fixing the chains are mounted in the cap 22. Also, more than two rollers 24 for guiding the chain 26 are mounted on a lower portion of the elevating cylinder 40. Further, the chain 26 extended from the fixing portion 23 to the lower portion of the elevating cylinder 40 is secured on a lower end of the rack 50 via the roller 24.

Hereinafter, an operation of the first preferred embodiment according to the present invention will be described.

First of all, before starting the operation, the worker should fix the unfolded legs 16 in order not to rotate after spreading the legs 16 of the moving body 10 at a desirable angle.

Figure 5A:
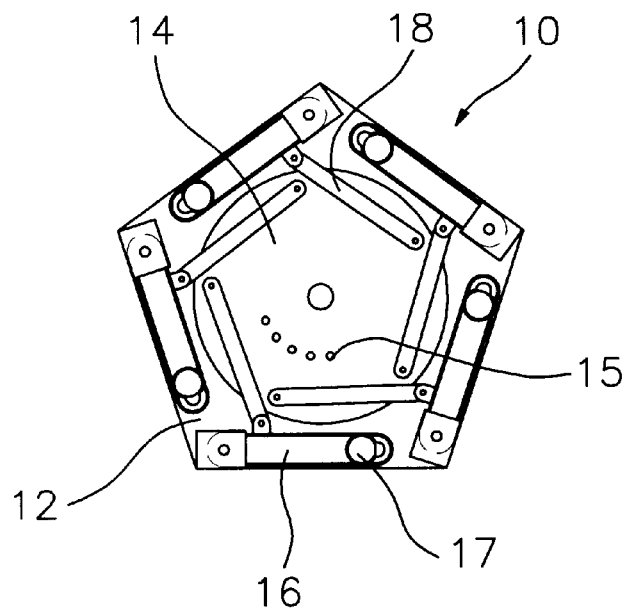
FIG. 5A is a bottom view showing a moving body of the movable work bench according to the first embodiment of the present invention, in which a plurality of legs are folded.
Figure 5B:
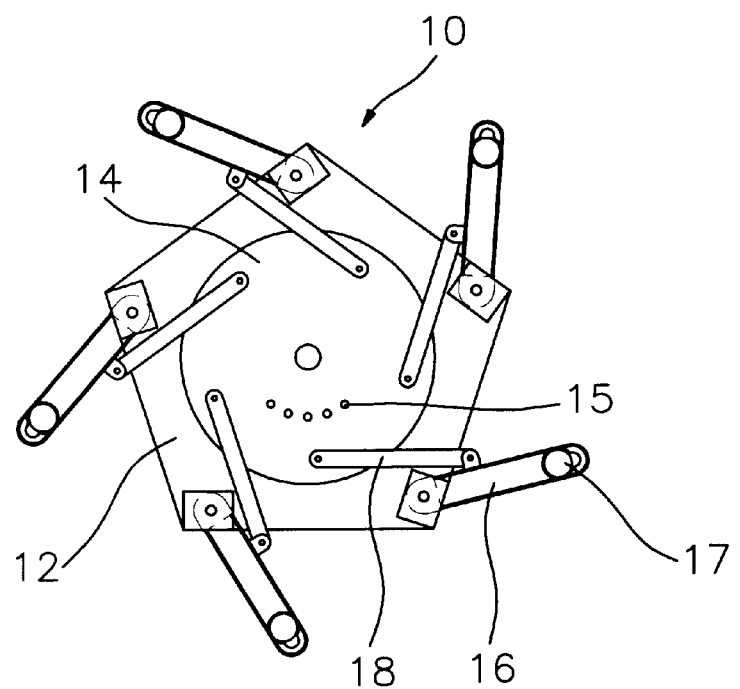
FIG. 5B is a bottom view showing the moving body of the movable work bench according to the first embodiment of the present invention, in which a plurality of legs are unfolded.

FIG. 5A is a bottom view showing a moving body of the movable work bench according to the first embodiment of the present invention, in which a plurality of legs are folded, and FIG. 5B is a bottom view showing the moving body of the movable work bench according to the first embodiment of the present invention, in which a plurality of legs are unfolded.

As shown in Fig. 5A and Fig. 5B, when the worker rotates the rotating disk 14 in the counterclockwise direction in the folding state of the legs 16, the links 18 connected to the rotating disk 14 push the legs 16 outside of the bottom plate 12. Therefore, the legs 16 are unfolded as a desirable angle at a side surface of the bottom plate 12. After aligning the center of the selected second fixing hole 15 among the second fixing holes 15 formed in the rotating disk with a center of the first hole 13 formed in the bottom plate 12, the worker inserts the stopper 19 in the concentric fixing holes 13, 15, by which the rotation of the rotating disk 14 is prevented. Therefore, because the rotating disk 14 does not rotate, the legs 16 having a caster 17 do not spread out more but are fixed to the bottom plate 12 at a constant angle.

The movable work bench holding the heavy object is freely moved via the casters 17. At this time, the movable work bench can be easily moved by properly adjusting the angle of the legs 16, according to the limitations of the working area such as a narrow area or a broad area.

Figure 6:
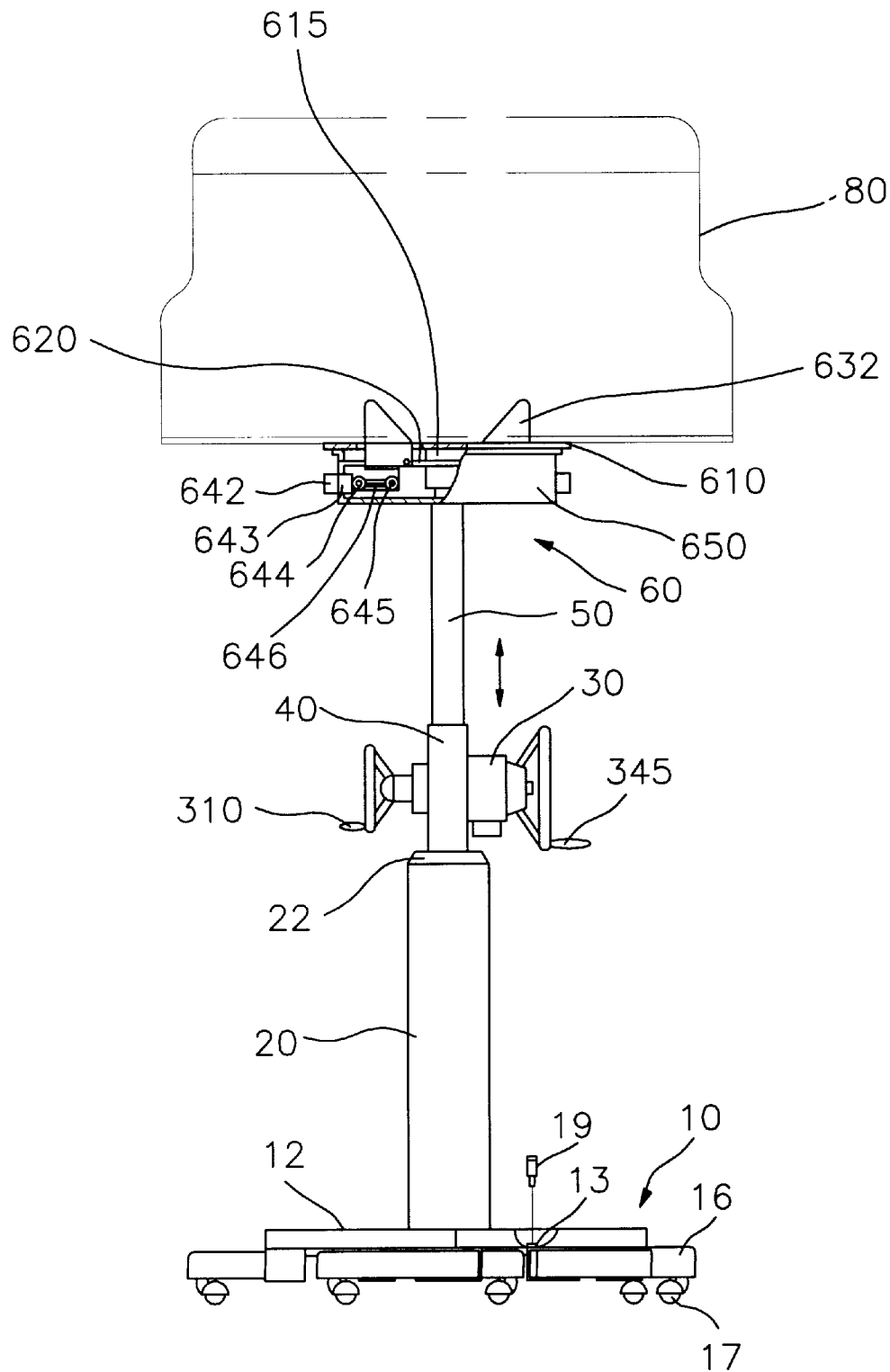
FIG. 6 is a view slowing a state in which a heavy object of a vehicle is positioned on the supporting body of the movable work bench according to the first embodiment of the present invention.

FIG. 6 is a view showing a state in which a heavy object of a vehicle lies on the supporting body of the movable work bench according to the first embodiment of the present invention.

Referring to the drawings and FIG. 6, the worker operates the driving means 30 and thus lifts the work bench, so as to load the heavy object 200 such as the transmission on the supporting body 60. When the worker rotates the first handle 310 of the driving means 30 in the clockwise direction, the rotator 315 rotates in the same direction. By means of the rotation of the rotator 315, the rotator 315 forces the first spacer 325, the ratchet gear 320, and the second spacer 335 into the fixing plate 330, and then rotates together with them. At this time, because the ratchet gear 320 does not engage with the pawl 323, the ratchet gear 320 rotates together with the rotator 315 in one direction.

Furthermore, the first spline shaft 317 mounted on the rotator 315 rotates in the clockwise direction, and thereby the rack 50 engaged with the pinion 318 of the first spline shaft 317 is lifted upwardly.

When the rack 50 is lifted upwardly, because the chain 26 fixed on the lower end of the rack 50 is lifted together with the rack 50, the roller 24 guiding the chain 26 is lifted and thus the elevating cylinder 40 is lifted upwardly.

When the worker takes his hands off the first handle 310, the rack 50 receives a great load in a downward direction due to the heavy object 200, and thus the ratchet gear 320 receives the rotating force through the pinion 318 in the counterclockwise direction. However, the ratchet gear 320 can not rotate in the counterclockwise direction due to the pawl 323, and the heavy object 200 is placed at the desirable height.

If the worker lowers the heavy object 200 at the above stopping state, when the worker rotates the first handle 310 in the counterclockwise direction, the rotator 315 rotates in the counterclockwise direction. At this time, because the ratchet gear 320 engages with the pawl 323, the rotator 315 minutely rotates relative to the ratchet gear 320 and axially moves by a fine gap with the nut 312. Accordingly, the first spacer 325 and the second spacer 335 are finely spaced from the ratchet gear 320.

Therefore, the ratchet gear 320 does not rotate due to engaging with the pawl 323, and the rotator 315 and the fixing plate 330 rotate together with the first spline shaft 317 in the counterclockwise direction. By means of the counterclockwise rotation of the first spline shaft 317, the rack 50 engaged with the pinion 318 of the first spline shaft 317 is lowered downwardly.

When the rack 50 is lowered downwardly, because the chain 26 fixed on the lower end of the rack 50 is lowered together with the rack 50, the roller 24 guiding the chain 26 is lowered and thus the elevating cylinder 40 is lowered downwardly.

When the worker takes his hands off the first handle 310 at the desirable height during the lowering operation of the work bench, the rack 50 receives a great load downwardly by the weight of the heavy object 200, and thus the pinion 318 receives the excessive rotating force through the rack 50. Therefore, because of the excessive rotating force of the first spline shaft 317, the fixing plate 330 integrally mounted on the first spline shaft 317 forces the first spacer 325 and the second spacer 335 into the rotator 315, and tightly sticks the rotator 315, the first spacer 325, the ratchet gear 320, and the second spacer 335 together. That is, the rotator 315, the first spacer 325, the ratchet gear 320, the second spacer 335, and the fixing plate 330 operate as an integrally joined piece. Therefore, because the ratchet gear 320 engages with the pawl 323, the ratchet gear 320 does not rotate and thus the joined piece does not rotate. As a result, the rack 50 is not lowered.

Alternatively, the worker may rotate the second handle 345 to operate the driving means 30. Because a diameter of the pinion 341 of the second spline shaft 340 is smaller than that of the cylindrical gear 316 of the rotator 315, the force applied to the second handle 345 by the worker is smaller than that applied to the first handle 310. When the second handle 345 rotates, the pinion 341 of the second spline shaft 340 rotates in the same direction, and the cylindrical gear 316 engaged with the pinion 341 rotates. Thus, the rotator 315 rotates, and the rack 50 and the elevating cylinder 40 are lifted or lowered according to the above described operation.

Figure 7:
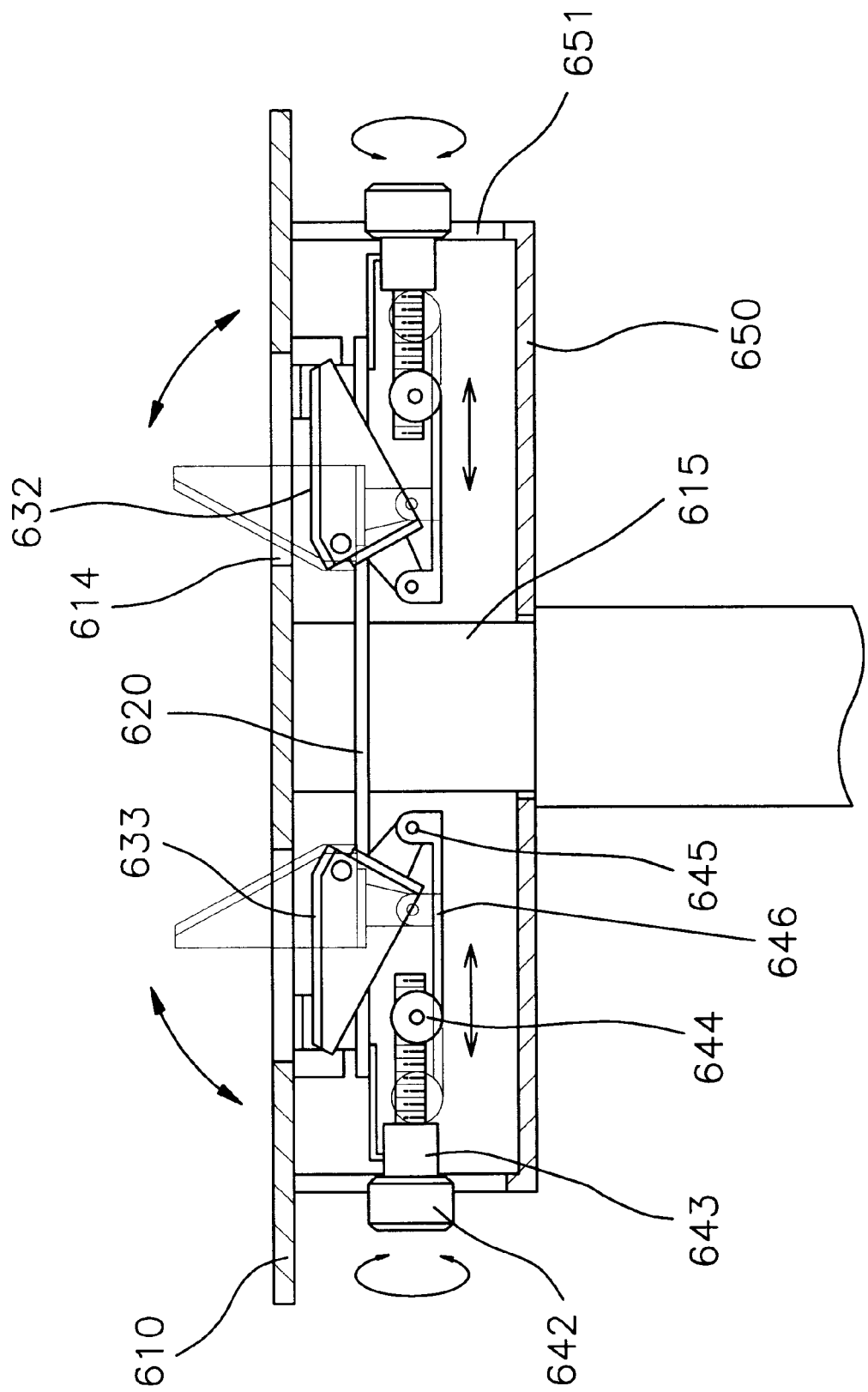
FIG. 7 is a view showing an operating state of the supporting body according to the first embodiment of the present invention.

FIG. 7 is a view showing an operating state of the supporting body according to the first embodiment of the present invention.

As shown in FIG. 7, after properly projecting the protruding piece 632 of the upholder 630 outside the upper plate 610, the worker loads the heavy object 200 onto the supporting body 60. The worker rotates the adjusting part 642 of the fine adjusting device 640 in the clockwise direction so as to balance the heavy object 200 during loading. The male screw 641 rotates in the clockwise direction by the adjusting part 642, and the first hinge part 644 moves toward the female screw 643. Therefore, the connecting bar 646 connected to the first hinge part 644 pulls the second hinge part 645, by which the supporting portion 631 of the upholder 630 rotates about the hinged rod 635 to run parallel with the rocking plate 620, and thereby the protruding piece 632 integrally formed with the supporting portion 631 is projected outside the upper plate 610 through the guide slots 614.

On the other hand, when the adjusting part 642 of the fine adjusting device 640 rotates in the counterclockwise direction, the device operates reversely, and the protruding part 632 is lowered beneath the upper plate 610.

When the worker rotates the female screw 645 installed on the lower box 650 so as to balance the other sides of the heavy object 200, the angle adjusting screw 624 pivotably connected to one side of the rocking plate 620 is lifted or lowered. At this time, by means of the operation of the angle adjusting screw 624, the rocking plate 620 seesaws about the connecting piece of the first eye 616, the second eye 622, and the pin 625. Accordingly, the height of the protruding pieces 632 of the upholder 630 is variable, and thus the heavy object is balanced.

Embodiment 2

Hereinafter, a movable work bench according to the second preferred embodiment of the present invention will be described.

The illustration and the reference numbers of the same components with the components constructing the movable work bench according to the first preferred embodiment of the present invention are similar with those of the first preferred embodiment.

FIG. 8 is an exploded perspective view showing a supporting body of a movable work bench according to a second embodiment of the present invention.

As shown in FIG. 8, a supporting body 80 of the movable work bench according to the second preferred embodiment of the present invention comprises an upper plate 82 having a plurality of guide slots 83 and a cylindrical boss 81, both upholders 85 lifting or lowering through the guide slots outside the upper plate 82, and a lower box 84 secured to a bottom surface of the upper plate 82 by a fastening means (riot shown).

A leveling means for balancing a heavy object 200 loaded on the supporting body 80 has an angle adjusting part 86 extended from the upper plate 82 to the Lower box 84, and a female screw 90 joining with the angle adjusting part 86 and installed on the lower box 84.

Furthermore, each upholder 85 is connected to the upper plate 82 by a hinged rod 89 passing through the lugs 91 formed on the bottom surface of the upper plate 82. A pair of supporting bars 87 are rotatably connected to the cylindrical boss 81 by a bolt 92, and support the upholder 85. An elevating adjuster 88 extended from the lower box 84 supports each supporting bar 87.

Hereinafter, the operation of the preferred second embodiment according to the present invention will be described.

The operation of the same components with the components constructing the movable work bench according to the first preferred embodiment of the present invention are similar with that of the first preferred embodiment.

When the elevating adjuster 88 rotates in order to lift the upholder 85 of the supporting body 80, the elevating adjuster 88 is lifted and then the supporting bar 87 forces upwardly a side portion of the upholder 85. Thus, the upholder 85 rotates about the hinged rod 89 and is projected outside the upper plate 82 through the guide slots 83.

When the elevating adjuster 88 rotates in a reverse direction, the upholder 85 is lowered at a lower portion of the upper plate 82.

Furthermore, when the female screw 90 connected with the angle adjusting part 86 rotates, the angle adjusting part 86 is lifted or lowered, and thereby the heavy object 200 is balanced.

As mentioned above, the worker can easily repair the heavy object such as a transmission or engine by using the movable work bench having an adjustable working height.

The movable work bench according to the present invention may safely support the heavy object and finely adjust the upholder to balance the heavy object in the loading state of the heavy object. Also, the driving means enables the supporting body to be lifted at a desirable height and to safely stop at the height. Furthermore, because the worker can move the movable work bench by adjusting the angle of the legs depending on the condition of the working area, efficiency of the repair work is improved.

While this invention has been particularly shown and described with reference to particular embodiments thereof, it will be understood by those skilled in the art that various changes in form and detail may be effected therein without departing from the spirit and scope of the invention as defined by the appended claims.

What is claimed is:

1. A movable work bench comprising:
   a moving body installed at a lower portion of the work bench for moving the movable work bench, wherein said moving body comprises:

a polyhedral bottom plate forming a first fixing hole through which a stopper is inserted;

a rotating disk rotatably installed on the bottom portion of the bottom plate, and forming a plurality of second fixing holes which can communicate with the first fixing hole of the bottom plate respectively;

a plurality of legs formed with one end rotatably connected to a corner and another end to which a caster is mounted; and a plurality of links connecting the rotating disk with each leg so that the legs are rotated at the same angle relative to each side of the polyhedral bottom plate;

a housing having one end mounted on a central portion of said moving body and another end adapted for installing a cap;

an elevating means installed in the housing, which lifts and lowers from and into the housing;

a driving means mounted on one part of the elevating means so as to lift and lower the elevating means; and a supporting body safely supporting heavy objects, which is lifted and lowered through an operation of the elevating means.

2. The movable work bench according to claim 1, wherein said elevating means includes:

a plurality of chains mounted in the cap and extended into a lower portion of the housing;

a plurality of rollers guiding each chain;

a rack vertically movable for lifting and lowering the supporting body, of which one end is mounted on the supporting body and another end is connected to the chains; and an elevating cylinder housing the rack and integrally installing the rollers on the lower end, by which the elevating cylinder lifts and lowers through the operations of the chains and the rollers acting simultaneously with the lifting and lowering operation of the rack.

3. The movable work bench according to claim 2, wherein said driving means includes:

a first handle for generating a driving force;

a rotator having a peripheral portion and a tapered portion, in which a cylindrical gear is installed around the peripheral portion and the first handle is mounted on the tapered portion;

a first spline shaft, of which one end passes through a center of the rotator to be secured with a nut and the other end has a first pinion engaged with the rack;

a ratchet gear and a pawl coaxially installed with the rotator and allowing to rotate in one direction;

a fixing plate for limiting an axial movement of the ratchet gear;

a first spacer coaxially mounted between the rotator and the ratchet gear;

a second spacer coaxially mounted between the ratchet gear and the fixing plate;

a second handle for generating the driving force; and a second spline shaft of which one end is secured to the second handle and another end has a second pinion engaged with the cylindrical gear, wherein a diameter of the second pinion is smaller than that of the first pinion.

4. The movable work bench according to claim 1, wherein said supporting body includes:

an upper plate forming a plurality of guide slots, a cylindrical boss, and a plurality of first eyes;

a rocking plate forming two pairs of lugs, a plurality of second eyes communicated with each of the first eyes on an upper surface of the rocking plate, and a central hole which the cylindrical boss passes through;

two upholders having a supporting portion for supporting a bottom surface of the rocking plate, and two protruding pieces formed integrally with the supporting portion and pivotably connected to the rocking plate by means of a hinged rod passing through a pair of lugs;

two fine adjusting devices for controlling the lifting and lowering operation of each of the upholders;

a leveling means installed at a side portion for adjusting an angle of the rocking plate relative to the upper plate; and a lower box mounted on the bottom surface of the upper plate.

5. The movable work bench according to claim 4, wherein each fine adjusting device includes:

an adjusting part for controlling the elevating operation of the upholder;

a male screw integrally formed with the adjusting part;

a female screw supporting the male screw and connected to the rocking plate;

a first hinge part which the male screw passing through the female screw is rotatably joined;

a second hinge part pivotably connected to the supporting portion of the upholder; and a connecting bar connecting the first hinge part with the second hinge part.

6. The movable work bench according to claim 5, wherein said leveling means includes:

an angle adjusting screw rotatably joined at a side of the bottom surface of the rocking plate; and a female screw installed at a side of the lower box.

7. The movable work bench according to claim 3, wherein the rotator, the first spacer, the ratchet gear, the second spacer, and the fixing plate are integrally combined when lifting the rack, being spaced from one another when lowering the rack.

8. The movable work bench according to claim 1, wherein said supporting body includes:

an upper plate having a plurality of guide slots, a plurality of lugs formed adjacently with each guide slot, and a cylindrical boss forming a hole on a periphery;

two upholders lifting and lowering through the guide slots;

two hinged rods pivotably connected to each of the upholders with lugs of the upper plate;

two supporting bars of which one end is secured to the hole of the cylindrical boss by a bolt, and another end supports a bottom surface of the upholder;

a lower box mounted on a bottom surface of the upper plate;

a leveling means having an angle adjusting part extended from the upper plate to the lower box, and a female screw joining with the angle adjusting part and installed on the lower box; and an elevating adjuster extended from the lower box to a bottom surface of the supporting bar, and rotating one end of the supporting bar relative to another end of the supporting bar.

* * * * *